Jan. 22, 1924.
P. DE F. WARNER
1,481,784
SCREW STUD FOR SNAP FASTENERS
Filed Jan. 25, 1923
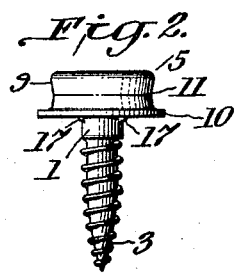
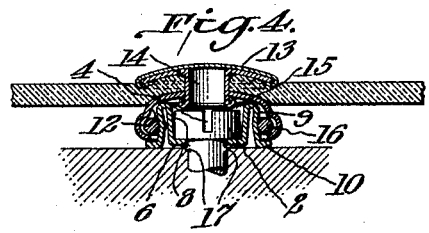
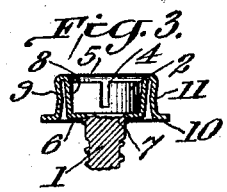
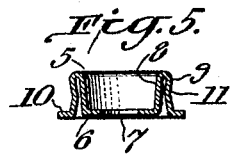
Inventor
Percy de F. Warner
by
Wm. H. Finckel
Attorney Patented Jan. 22, 1924.

1,481,784

UNITED STATES PATENT OFFICE.

PERCY DE F. WARNER, OF WATERBURY, CONNECTICUT, ASSIGNOR TO SCOVILL MANUFACTURING COMPANY, OF WATERBURY, CONNECTICUT, A CORPORATION OF CONNECTICUT.

SCREW STUD FOR SNAP FASTENERS.

Application filed January 25, 1923. Serial No. 614,890.

*To all whom it may concern:*

Be it known that I, PERCY DE F. WARNER, a citizen of the United States, residing at Waterbury, in the county of New Haven and State of Connecticut, have invented a certain new and useful Improvement in Screw Studs for Snap Fasteners, of which the following is a full, clear, and exact description.

This invention is in the nature of an improvement on capped screws, in which the cap serves as the head or stud member of a snap fastener and the screw as the attaching member.

The invention relates to that type of snap fasteners in which the socket and stud are of considerable diameter in order to insure large contact surfaces between the two and thereby enhance the holding power of the fastener, such fastener being particularly useful in connection with the curtains of motor vehicles.

The invention is primarily designed to provide a non-resilient or rigid head or stud for cooperation with a resilient or spring socket, although not so limited.

The invention consists of a screw stud or head provided with an open-faced cap embracing the head of the screw and leaving the nick or slot in the head of the screw exposed to receive a screw-driver so that the device may be set or applied without strain upon the cap, as I will proceed now to explain and finally claim.

In the accompanying drawings illustrating the invention, in the several figures of which like parts are similarly designated, Figure 1 is a top plan view; Fig. 2 is a side elevation, and Fig. 3 is a transverse section in the plane of line 3—3, Fig. 1, illustrating the present embodiment of the invention. Fig. 4 is a transverse section illustrating the invention connected with an available form of spring socket. Fig. 5 is a transverse section of the cap alone.

I have shown the invention as applied to a screw 1 having a cylindrical head 2, commonly called a cap screw, and a gimlet-pointed shank 3, the head having a transverse nick or slot 4 as usual. This is a well known commercial form of screw.

Applied to the screw is the cap 5, shown detached in Fig. 5, and having a bottom 6 provided with a central perforation 7. Rising from the bottom is the substantially cylindrical inner wall 8, of slightly greater height than the height of the head 2 of the screw, and the outer and substantially parallel wall 9. This outer wall ends in a laterally extending flange 10 substantially on a level with the bottom 6. The arrangement of the flange 10 substantially in the horizontal plane of the bottom 6, or, to put the matter in another way, the arrangement of the bottom 6 and flange 10 in substantially the same horizontal plane, prevents the distortion of the walls 8 and 9 when the screw is screwed home.

The outer wall 9 may be slightly bowed inwardly, as at 11 to form an engaging surface to be engaged by a spring socket.

One process of making the cap consists in taking a circular blank cut from sheet metal and passing it along from one set of tools to another which draw the outer wall 9 until the required height above the flange 10 is reached. While this drawing is done the bottom 6 is carried along partway, and then a reverse drawing operation begins which carries the bottom back substantially to where it originally was, that is to say, substantially into the plane of the original round blank, thereby forming the inner wall 8 on the way back.

As already noted, the walls 8 and 9 rise slightly above the top surface of the screw head and this for the purpose of providing clearance for the socket member. To illustrate the meaning, reference is made to Fig. 4, in which the socket member comprises a socket piece 12 of inverted and rounded cup-shape and perforated centrally to receive the fastening cap 13 which has an eyelet 14 which is clinched as shown at 15 inside of the socket piece. The difference in height between the head of the screw and the walls of the cap surrounding it affords a space to receive the clinched end of the eyelet and allow intimate close contact of the socket piece and stud.

The spring 16 is a divided spring ring, held in place within the socket piece 12 by its own elasticity and the conformation of the mouth of the socket piece. When the stud and socket member are engaged, as in Fig. 4, the spring ring contacts about the outer wall 9 of the stud with sufficient force to hold the parts so tightly as to require force to separate them.

As will be understood, the cap is an open face structure, in which the nick or slot 4 in the screw head as well as the entire face of the screw head are exposed, and, hence, the nick or slot is available for direct application of a screw-driver to set the stud, or, in other words, to apply it. No strain whatever is placed upon the cap in the act of setting or attaching the stud.

It will be noted that the cap is made of a single piece, and thus there is an economy both in metal and labor in its manufacture.

The substantially parallel walls of the cap support one another, and are much stronger than a single wall, even though made of metal considerably thinner in gauge. An incidental advantage of this thinness is that the metal is easier and less expensive to handle in the manufacturing processes.

Reference has already been made to the fact that the perforated bottom and the base flange are in substantially the same horizontal plane. If the bottom were brought down only part way and the attaching screw driven in with too much force, the screw head would carry the perforated bottom down with it and draw in the upper part which engages with the socket, and this deformation would prevent the stud and socket effectively snapping together as intended. This objection is avoided by my invention.

Any suitable means may be used to fix the cap on the screw head so as to prevent it turning, and one such efficient means consists in slightly scoring or upsetting the metal of the screw against the bottom of the cap, as indicated at 17, Figs. 2 and 4.

It will be understood that the inner wall 8 and the bottom 6 of the cap form, in effect, a central depression in the cap, in which depression the head of the screw has a substantially tight fit substantially throughout its height. This substantially tight or close fit between the head of the screw and the surrounding wall of the cap serves to support the wall of the cap and prevents the crushing of the cap and its deformation in the operations of connecting and disconnecting the stud and its complemental socket; and its utility in these respects is especially great when, as already suggested, the cap is made of relatively thin metal.

Variations in details of construction are permissible within the spirit of the invention and the claims following.

What I claim is:—

1. A stud for snap fasteners, having a socket engaging element provided with a central depression with substantially parallel inner and outer walls and a perforated bottom and an external laterally extending base flange substantially in the plane of the bottom aforesaid, and a screw having a substantially cylindrical head accurately fitting within the depression and in relatively close contact with its inner wall and having its nicked or slotted portion extending nearly to the top of the depression and exposed therein.

2. A stud for snap fasteners, comprising a cap screw, and an open face cap having substantially parallel inner and outer walls surrounding the head of the screw and extending slightly above it and forming a central depression into which the head of the screw is sunk, said head having a substantially tight fit with the inner wall substantially throughout its height, the outer wall of the cap having a laterally projecting base flange arranged in substantially the same level as the bottom of the depression in the cap.

3. A rigid stud for socket fasteners, comprising a cap screw, and a cap applied to the head of the screw and pressing it closely, said cap having a perforated bottom from which extends normally a screw head surrounding wall of substantially greater height than the height of the screw head and engaging said head closely substantially throughout its height, said wall being continued thence outwardly and downwardly toward and substantially to the plane of the perforated bottom and terminating in a laterally extending flange, the outer wall being bowed inwardly but otherwise substantially parallel to the inner wall.

In testimony whereof I have hereunto set my hand this 22d day of January, A. D. 1923.

PERCY DE F. WARNER.

Witnesses:
PAUL E. FENTON,
CHARLES FEHL.